July 31, 1934.  T. KÜMMICH  1,968,527
CHANGE SPEED GEAR
Filed Oct. 27, 1931

Inventor.

Patented July 31, 1934

1,968,527

UNITED STATES PATENT OFFICE 1,968,527

CHANGE SPEED GEAR

Theodor Kümmich, Stuttgart, Germany, assignor to Daimler-Benz Aktiengesellschaft, Stuttgart-Unterturkheim (Berlin), Germany, a company of Germany Application October 27, 1931, Serial No. 571,402 In Germany April 4, 1931

3 Claims. (Cl. 74—333)

This invention relates to a change speed gear with a main shaft divided into three parts, particularly for automobile vehicles, wherein two parts of the shaft are connected with the lay shaft by toothed wheels permanently meshing with one another, and the third part of the shaft is connected with the lay shaft by disengageable toothed wheels.

The invention consists primarily in supporting the two outer parts of the main shaft in the casing, one in the other, and constructing the central part of the main shaft as a hollow shaft and supporting it upon one or both of the two other parts of the main shaft.

The object of dividing up the main shaft in this way is to enable a clutch to be provided which will not have an intermediate position of rest, and which will be provided with over-running claws, without the gear being thereby limited to two speeds only, as would be the case with a clutch of this type having an undivided main shaft.

The gears of this nature hitherto known have exhibited the disadvantage that the parts of the shaft had to be supported independently of one another, and consequently yielded a complicated and expensive construction if the real purpose of these gears, namely a noiseless change of speed and a noiseless drive, was to be obtained.

This disadvantage is eliminated by the present invention, since owing to the special manner in which the individual parts of the shaft are supported one in the other, a sufficiently rigid system is formed, so that intermediate bearings in the casing can be omitted and the gear is very short.

Figure 1:
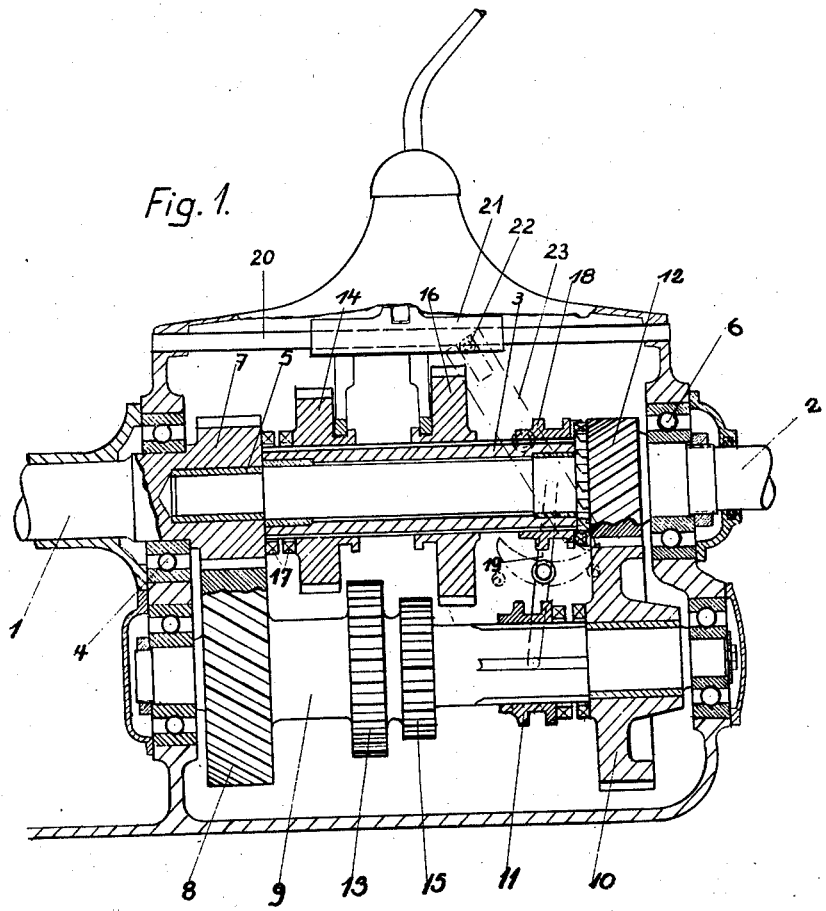
Figure 2:
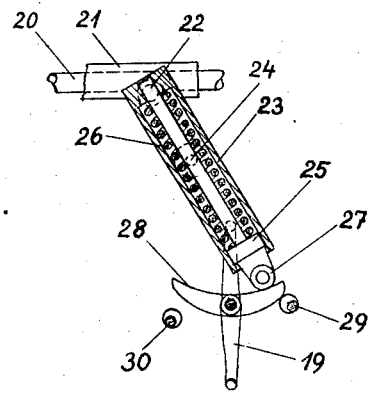

One form of construction of the invention is illustrated in section by way of example in the accompanying drawing, Figure 1 being a longitudinal section through the driving mechanism, and Figure 2 a view, partially in section, of the controlling means for the change-speed clutch mechanism.

The main shaft system is composed for example of three main shaft parts, the driving shaft member or clutch shaft 1, the driven shaft member or cardan shaft 2, and the intermediate shaft 3, constructed as a hollow shaft. The clutch shaft 1 is journalled in the casing at 4. The cardan shaft, extending right through the casing, is journalled at one end in the clutch shaft at 5 and at the rear in the casing at 6. Upon this shaft is supported the hollow shaft 3, which, as hereinafter described, can be coupled on the one hand to the clutch shaft and on the other hand to the cardan shaft.

With the clutch shaft is connected integrally or otherwise, a toothed wheel 7 which, through a toothed wheel 8, drives a lay shaft 9. Upon the rear end of the shaft is rotatably mounted a toothed wheel 10, which can be coupled to the lay shaft by means of a dog clutch 11, which is constructed as an over-running clutch without an intermediate position of rest and bevelled claw faces. The toothed wheel 10 is permanently in mesh with a toothed wheel 12. The latter may be integral with the shaft member 2, or may be connected therewith by keys.

Between the toothed wheels so far mentioned are furthermore arranged toothed wheels 13, 14, and also 15, 16. By means of claws 17, the shaft 1 may be connected with the wheel 14, and therefore with the hollow shaft 3. Furthermore the hollow shaft may be coupled to the shaft 2 by means of a dog clutch 18. The clutch members 18 and 11 are connected by means of a two-armed lever 19 in such a manner that when one clutch is closed the other is opened.

The gear illustrated, accordingly comprises, apart from the reverse speed, which is not shown, four different speeds. For the first three speeds the clutch 18 is engaged and the clutch 11 disengaged. The toothed wheel 10 is therefore permanently connected to the cardan shaft 2 or with the vehicle, while only the lay shaft, with the toothed wheels 8, 13 and 15 revolves with the clutch shaft, so that easy changing of speed is rendered possible.

The first speed is under these circumstances obtained by engaging the wheel 16 with the wheel 15, the second speed by engaging the wheel 14 with the wheel 13 and the direct drive by coupling the claws 17. A fourth or high speed is obtained by throwing over the lever 19 whereby the claws 18 are uncoupled and the clutch 11 is connected with the wheel 10. The drive is then effected from the shaft 1, through toothed wheels 7 and 8, the lay shaft 9 and the toothed wheels 10 and 12, to the shaft 2.

For the actuating of the lever 19 there is provided a striker rod 20, upon which a control sleeve 21 can slide. The latter carries a pin or roller 22, which engages in a slot in a tubular lever 23, which is rockable about a pivot 24. Inside the tubular lever 23 slides a piston 25, carrying a roller 27, pressed by a spring 26 against a cam surface 28 secured to the lever 19. The cam stops 29 and 30, adjustable by rotation, limit the rocking movement of the cam 28 and therefore of the lever 19. If the sleeve 21 is displaced to the right, the lever 23 rocks about the pivot 24. The spring 26 is thereby stressed, and the roller 27 runs down along the cam 28. After passing beyond the mid position of the cam 28 the roller 27 begins to exert an opposite torque upon the lever 19, so that the latter is tilted over against the stop 30. By this movement the direct drive is disengaged and the fast speed put in.

The striker mechanism described has the advantage, as compared with the mechanisms of a similar nature hitherto known, which have the tension spring between the two levers located externally, of taking up less space so that it can be fitted into the gear casing without special difficulty.

What I claim is:—

1. In a driving mechanism a gear casing, three co-axial shafts each freely rotatable relatively to the others, namely a driving shaft journaled in the gear casing, a driven shaft likewise journaled in the gear casing, these two shafts being supported with their ends one in the other, and an intermediate shaft constructed as a hollow shaft and rotatably supported upon at least one of the aforementioned shafts, a lay shaft, a pair of toothed wheels permanently meshing with one another between the driving shaft and the lay shaft, a second pair of toothed wheels permanently meshing with one another between the lay shaft and the driven shaft, pairs of engageable and disengageable toothed wheels between the lay shaft and the hollow shaft, coupling means for coupling the driving shaft to the hollow shaft.

2. In a driving mechanism a gear casing, three co-axial shafts each freely rotatable relatively to the others, namely a driving shaft journaled in the gear casing, a driven shaft likewise journaled in the gear casing, these two shafts being supported with their ends one in the other, and an intermediate shaft constructed as a hollow shaft and rotatably supported upon at least one of the aforementioned shafts, a lay shaft, a pair of toothed wheels permanently meshing with one another between the driving shaft and the lay shaft, a second pair of toothed wheels permanently meshing with one another between the lay shaft and the driven shaft, one toothed wheel of this second pair being freely rotatable upon the lay shaft and the other being connected fast with the driven shaft, pairs of engageable and disengageable toothed wheels between the lay shaft and the hollow shaft, coupling means for coupling the driving shaft to the hollow shaft.

3. In a driving mechanism a gear casing, three co-axial shafts each freely rotatable relatively to the others, namely a first end shaft journaled in the gear casing, a second end shaft likewise journaled in the gear casing, these two end shafts being supported with their ends one in the other, and an intermediate shaft constructed as a hollow shaft and rotatably supported upon at least one of the aforementioned shafts, a lay shaft, a pair of toothed wheels permanently meshing with one another between the first end shaft and the lay shaft, a second pair of toothed wheels permanently meshing with one another between the lay shaft and the second end shaft, pairs of engageable and disengageable toothed wheels between the lay shaft and the hollow shaft, coupling means for coupling the first end shaft to the hollow shaft, a clutch, of which one member revolves continuously with the hollow shaft and the other member revolves continuously with the second end shaft, actuating means by which these two clutch members can be brought into engagement with one another for the purpose of coupling the hollow shaft to the second end shaft, another clutch, of which one member continuously revolves with the lay shaft and the other member continuously revolves with the second end shaft, further actuating means by which these two last-mentioned clutch members can be coupled to one another, this latter clutch means being so arranged that it brings the lay shaft into driving connection with the second end shaft through the second pair of permanently meshing toothed wheels, and control mechanism by which the two said actuating means are so connected with one another that when the first clutch is closed the second is opened, and when the second clutch is closed the first is opened.

THEODOR KÜMMICH.